US012790243B2

(12) United States Patent
Zidon et al.

(10) Patent No.: US 12,790,243 B2
(45) Date of Patent: Nov. 10, 2026

(54) WASTEWATER TREATMENT SYSTEM

(71) Applicant: CLARISTREAMS LTD., Jerusalem (IL)

(72) Inventors: Yehoyada Aviah Zidon, Jerusalem (IL); Bnaya Zidon, Givat Shmuel (IL); Eytan Baruch Levy, Rosh Ha-ain (IL)

(73) Assignee: CLARISTREAMS LTD., Jerusalem (IL)

(*) Notice: Subject to any disclaimer, the term of this patent is extended or adjusted under 35 U.S.C. 154(b) by 775 days.

(21) Appl. No.: 17/762,963

(22) PCT Filed: Sep. 29, 2020

(86) PCT No.: PCT/IL2020/051059
§ 371 (c)(1),
(2) Date: Mar. 23, 2022

(87) PCT Pub. No.: WO2021/064725
PCT Pub. Date: Apr. 8, 2021

(65) Prior Publication Data

US 2022/0356087 A1 Nov. 10, 2022

(30) Foreign Application Priority Data

Oct. 2, 2019 (IL) .......................................... 269764

(51) Int. Cl.
*C02F 1/52* (2023.01)
*C02F 1/24* (2023.01)
(Continued)

(52) U.S. Cl.
CPC .............. *C02F 1/5209* (2013.01); *C02F 1/24* (2013.01); *C02F 11/123* (2013.01); *C02F 11/14* (2013.01);
(Continued)

(58) Field of Classification Search
CPC ........ C02F 1/5209; C02F 1/24; C02F 11/123; C02F 11/14; C02F 2103/20; C02F 2209/105; C02F 2209/11
See application file for complete search history.

(56) References Cited

U.S. PATENT DOCUMENTS 4,460,461 A 7/1984 Perchthaler et al.
4,707,272 A 11/1987 Kistler
(Continued)

FOREIGN PATENT DOCUMENTS

EP 0 950 639 A1 * 3/1998 ................ C02F 1/52
GB 2113563 A 8/1983
(Continued)

*Primary Examiner* — Youngsul Jeong
(74) *Attorney, Agent, or Firm* — Ballard Spahr LLP

(57) ABSTRACT

A system for treating wastewater comprising a coagulation-flocculation assembly having a raw wastewater inlet and a coagulated-flocculated wastewater outlet; and a slurry separator comprising an intake area configured for receiving wastewater slurry from the coagulated-flocculated wastewater outlet, a liquid outlet, a sludge outlet, and a filtration module configured to facilitate percolating of liquid therethrough and forming of a filter cake thereon. The slurry separator being configured to receive slurry at the intake area, separate the slurry to liquid and sludge by the filtration module, remove the liquid via the liquid outlet, and convey the sludge from the intake area to the sludge outlet. The system further comprises a level maintaining arrangement configured to maintain at least a minimal level of the filter cake.

15 Claims, 8 Drawing Sheets

(51) Int. Cl.

| | |
|---|---|
| ***C02F 11/12*** | (2019.01) |
| ***C02F 11/123*** | (2019.01) |
| ***C02F 11/14*** | (2019.01) |
| *C02F 103/20* | (2006.01) |

(52) U.S. Cl.
CPC .... *C02F 2103/20* (2013.01); *C02F 2209/105* (2013.01); *C02F 2209/11* (2013.01)

(56) References Cited

U.S. PATENT DOCUMENTS

| | | | | |
|---|---|---|---|---|
| 6,692,642 | B2 | 2/2004 | Josse et al. | |
| 7,001,525 | B2 * | 2/2006 | Binot | B01D 21/30 210/709 |
| 7,691,261 | B2 | 4/2010 | Deskins | |
| 9,505,638 | B2 | 11/2016 | Sauvignet et al. | |
| 10,486,089 | B2 * | 11/2019 | Dominiak | B01D 29/00 |
| 2012/0255902 | A1 * | 10/2012 | Livingston | B01D 61/145 210/151 |
| 2017/0355629 | A1 * | 12/2017 | Jæger | C02F 3/109 |

FOREIGN PATENT DOCUMENTS

| | | | |
|---|---|---|---|
| JP | S58180212 | A | 10/1983 |
| WO | 2017168054 | A1 | 10/2017 |

* cited by examiner

WASTEWATER TREATMENT SYSTEM

TECHNOLOGICAL FIELD

The presently disclosed subject matter concerns wastewater treatment systems.

BACKGROUND

Wastewater treatment systems are used to help facilities avoid harming the environment or the human health. Livestock facilities for example, which produce wastewater as byproduct, incorporate wastewater treatment systems in their processes to produce wastewater which meet the standards of their local environmental regulations, e.g. for disposal thereof through the municipal sewage system, for irrigation of nearby fields, for running these wastewater into a nearby river, etc.

GENERAL DESCRIPTION

The presently disclosed subject matter concerns wastewater treatment systems for use in livestock facilities such as cowsheds, piggeries, or any other facility producing wastewater as byproduct and treating these wastewater before discharge thereof, optionally through the sewage system.

The term wastewater as disclosed herein refers to any liquid inter alia containing suspended solids, optionally organic. In dairy farms for example, wastewater can originate from floor washing, milking parlors, and collecting yards.

Particularly, the system disclosed herein is configured to receive wastewater influent, remove suspended solids therefrom, and thereby produce a clearer liquid effluent, containing less suspended solids, with respect to the wastewater influent.

Even more particularly, the system disclosed herein is configured to flock the suspended solids in the wastewater to form a wastewater slurry, and then remove the flocks from the wastewater slurry by filtration.

The system can be designed and optimized such that the effluent complies with the standards of certain local environmental regulations, for discharge thereof through municipal sewage system.

According to a first aspect of the presently disclosed subject matter, there is provided a system for treating wastewater, comprising:

a coagulation-flocculation assembly having a raw wastewater inlet, a coagulated-flocculated wastewater outlet, a coagulating agent inlet configured to facilitate introduction of coagulating agent to the coagulation-flocculation assembly; the coagulation-flocculation assembly is configured to receive raw wastewater through the raw wastewater inlet, facilitate mixing of the raw wastewater with the coagulating agent therein so as to form coagulated wastewater, facilitate flocculation of the coagulated wastewater so as to form coagulated-flocculated wastewater slurry, and dispense the coagulated-flocculated wastewater through the coagulated-flocculated wastewater outlet; and a slurry separator comprising an intake area configured for receiving wastewater slurry from the coagulated-flocculated wastewater outlet, a liquid outlet, a sludge outlet, and a filtration module configured to facilitate percolating of liquid therethrough and forming of a filter cake thereon; the slurry separator is configured to receive slurry at the intake area, separate the slurry to liquid and sludge by the filtration module, remove the liquid via the liquid outlet, and remove the sludge via the sludge outlet;

wherein the system further comprises a level maintaining arrangement configured to maintain at least a minimal level of the filter cake.

Optionally, the coagulation-flocculation assembly can further comprise a flocculating agent inlet configured to facilitate introduction of flocculating agent to the coagulation-flocculation assembly. In such a case, the flocculation of the coagulated wastewater includes mixing of the coagulated wastewater with the flocculating agent.

It can be appreciated that at least one of—the removal of the sludge through the sludge outlet, or the dispensing of wastewater slurry through the coagulated-flocculated wastewater outlet, is performed at an adjustable rate, controlled by a respective actuator thereof.

The Level Maintaining Arrangement can Comprise:

a sensor configured to sense a level parameter indicative of the level of the filter cake on the filtration module, and produce a corresponding level signal indicative of the value of said level parameter; and a controller configured to receive said level signal and produce a corresponding rate signal configured to be received by the respective actuator so as to adjust the respective flow rate thereof, to maintain at least a minimal level of the filter cake on the filtration module.

According to an example, the actuator can be configured to adjust the removal rate of the sludge through the sludge outlet.

The term raw wastewater as used herein, refers to wastewater introduced into the coagulation-flocculation assembly, whether these wastewater has gone through any kind of pre-treatment beforehand, or not. Such pre-treatment can include, for example, mixing of the wastewater to enhance homogeneity thereof, sedimentation of the wastewater to achieve some separation between liquids and suspended solids beforehand, chemical treatment, etc.

It can be appreciated that such pre-treatment can include for example pre-flocculation of the wastewater, or even pre-coagulation-flocculation of the wastewater.

The term liquid as used herein refers to a part of the slurry which percolates through the filtration module, while the term sludge as used herein refers to a part of the slurry which remains above the filtration module and reaches the sludge outlet.

The wastewater treatment system can further comprise an arrangement configured to facilitate such a pre-treatment, e.g. a mixing tank, optionally separate from the coagulation-flocculation assembly, configured to facilitate mixing of the raw wastewater before entering thereof to the coagulation-flocculation assembly. The mixing tank can include a mixing arrangement, e.g., a mixing rotor.

It should be appreciated that the raw wastewater inlet can constitute at least one of the coagulating agent inlet and the flocculating agent inlet. According to an example, at least one of these inlets is located on an intake stream of the raw wastewater into the coagulation-flocculation assembly. Optionally, the coagulating agent inlet and the flocculating agent inlet are unified.

According to an example, the coagulation-flocculation assembly is a unified tank configured to facilitate sequential mixing of the wastewater therewithin, firstly with the coagulating agent and secondly with the flocculating agent.

Optionally, the coagulation-flocculation assembly can include a mixing arrangement configured to enhance the mixing of at least one of the coagulating agent and the flocculating agent with the wastewater.

The system can operate continuously, i.e. constantly receive raw wastewater through the raw wastewater inlet, coagulate these raw wastewater in a coagulation tank, flocculate the coagulated wastewater in a flocculation tank, separate the coagulated-flocculated wastewater into sludge and liquid in a continuous manner, remove the sludge through the sludge outlet, and remove the liquid through the liquid outlet.

The Coagulation-Flocculation Assembly can Comprise:

- a coagulation tank comprising the raw wastewater inlet, a coagulated wastewater outlet, and the coagulating agent inlet; the coagulation tank configured to receive raw wastewater through the raw wastewater inlet, facilitate mixing of the raw wastewater with the coagulating agent therein, and facilitate dispensing of coagulated wastewater therefrom through the coagulated wastewater outlet; and
- a flocculation tank comprising a coagulated wastewater inlet is in flow communication with the coagulated wastewater outlet, and the coagulated-flocculated wastewater outlet; the flocculation tank is configured to receive coagulated wastewater through the coagulated wastewater inlet, facilitate flocculation of the coagulated wastewater therein, and facilitate dosing of the coagulated-flocculated wastewater therefrom through the coagulated-flocculated wastewater outlet.

According to an example, the coagulation tank and the flocculation tank are adjacent, optionally such that they have a common wall between them. In such a case, the coagulated wastewater outlet and the coagulated wastewater inlet can both be constituted by one or more apertures formed in that common wall, and thereby facilitate free flow of coagulated wastewater from the coagulation tank to the flocculation tank.

The raw wastewater inlet and the coagulated wastewater outlet can be arranged on the coagulation tank so as to create a flow regime within the coagulation tank which causes a volume of wastewater entering through the raw wastewater inlet to spend enough time in the coagulation tank to allow sufficient coagulation to occur.

Similarly, the coagulated wastewater inlet and the coagulated-flocculated wastewater outlet can be arranged on the flocculation tank to create a flow regime within the flocculation tank which causes a volume of wastewater entering through the coagulated wastewater inlet to spend enough time in the flocculation tank to allow sufficient flocculation to occur.

The definition of sufficient flocculation as well as of sufficient coagulation can differ between users of the wastewater treatment system, namely, due to differences in their relevant local water regulations.

The filtration module can be a conveyor configured to convey sludge from the intake area to sludge outlet, while facilitating percolating of liquid therethrough along the way. The liquid can percolate through the conveyor, optionally onto a gutter-like element configured to funnel the liquid to the liquid outlet. According to an example, this gutter-like element is a slide configured to funnel the liquid by gravity.

A conveyor type filtration module can facilitate rapid separation of the slurry.

Since the wastewater slurry is initially received at the intake area of the conveyor, most of the separation between the sludge and the liquid occurs there. For that reason the level of the filter cake at the intake area is important for determining the quality of the liquid at the liquid outlet.

The rate of conveyance of sludge from the intake area to the sludge outlet can determine the level of the filter cake at least at the intake area. The higher the rate of conveyance is, the less sludge is accumulated at the intake area, thus the lower the filter cake is.

According to an example, the system is configured to facilitate free flow of coagulated-flocculated wastewater from the coagulated-flocculated wastewater outlet to the intake area of the conveyor, which can be facilitated by gravity and head of wastewater in the coagulation-flocculation assembly. In this case, the conveyance rate of the sludge can be determined according to readings of a head sensor configured to measure a level parameter indicative to the head of wastewater in the coagulation-flocculation assembly, so as to maintain at least a minimal level of the filter cake.

It should be appreciated that the coagulated-flocculated wastewater outlet can be disposed above the intake area of the slurry separator, and thereby facilitate delivering of the coagulated-flocculated wastewater thereto in free flow by gravity. The level of the coagulated-flocculated wastewater outlet above the intake area can be optimized to reduce splashing.

The conveyor can be at least partially sloped upwards towards the sludge outlet to contribute to the forming of the filter cake. To facilitate forming of the filter cake at the intake area, the sloping of the conveyor can be performed specifically just there or throughout its entire length. In such a case, it can be appreciated that the filter cake can lean on a wall of the coagulation-flocculation assembly, which optionally containing the coagulated-flocculated wastewater outlet, to thereby enhance its stability. Alternatively, the filtration module can be horizontal and include a barrier, configured to hold back some of the slurry to ensure the minimal level of the filter cake at an area of the filtration module before the barrier.

To prevent plugging of the filtration module, the conveyor can be a self-cleaning conveyor, optionally containing rows of rotating blades, such that each row is aligned with its adjacent other to cause each blade in the row to slide over a mating blade in the adjacent row with each rotation. The rotation of the blades can advance the sludge from the intake area to the sludge outlet, whilst the sliding of the blades on each other can clean them with each rotation. The percolating of liquid in this case can be performed through the area between the blades.

According to an example the conveyor can be a wave separator/multi-disc roller separator by: Kendensha/Trident/Benenv et cetera According to an example, the system can further comprise a turbidity sensor configured to sense a turbidity parameter indicative of turbidity of the liquid at the area of the liquid outlet, e.g., turbidity at the gutter-like element or in the effluent conduit.

It can be appreciated that the introduction of at least one of the flocculating agent and the coagulating agent can be performed at an adjustable supply rate, optionally by a designated dispenser. The dispenser can be a pump when the respective agent is dissolved in liquid, or a particulate material dispenser, e.g., powdered, granulized, etc. According to an example, the adjustable rate can be determined according to readings of the turbidity sensor, so as to maintain at least a maximal level of turbidity of liquid at the liquid outlet.

The system can further comprise a floc sensor configured to sense a size parameter indicative of at least one attribute related to the flocs in the slurry such as size of flocs in the slurry, shape of flocs in the slurry, color of the slurry, color of the flocs, and contrast of the color of the flocs with respect to the slurry. The floc sensor can be configured to operate at an area of the coagulated-flocculated wastewater outlet, or at the area of the liquid outlet. The floc sensor can be optic, e.g., a camera, optionally equipped with an image processing module.

It can further be appreciated that at least one of the above adjustable supply rates can be determined according to readings of the floc sensor, e.g., so as to maintain the size of the flocs in the slurry, at the area of the coagulated-flocculated wastewater outlet, within a predetermined range.

According to an example, the system further comprises a floc-size sensor configured to sense a size parameter indicative of size of flocs in the slurry at an area of coagulated-flocculated wastewater outlet, e.g., flock size at an area of the coagulated-flocculated wastewater outlet. According to an example, this floc-size sensor is optic based, e.g., a camera coupled to an image processing module configured to analyze images produced by the camera to evaluate a common floc-size.

According to an example, the supply rate of the coagulating agent is determined according to readings of the turbidity sensor, and the supply rate of the flocculating agent is determined according to readings of the floc-size sensor.

The supply rate of flocculating agent determines the common floc-size in the slurry, as the more flocculating agent is dosed into the slurry, the smaller the flocs therein. For example, when it is desired to achieve flocs which are big enough to be filterable, the supply rate of flocculating agent can decrease as the common floc-size measured increases.

According to an example, when the value of the turbidity parameter read by the turbidity sensor increases, the supply rate of the coagulating agent increases, and, respectively, when the value of the size parameter read by the floc-size sensor increases, supply rate of the flocculating agent decreases.

Optionally, when the floc-size sensor readings exceed a certain value, the supply rate of the flocculating agent reduces and even stops.

According to another aspect of the presently disclosed subject matter, there is provided a method for treating wastewater comprising the steps of:

(a) providing a coagulation-flocculation assembly;
(b) providing a filtration module configured to facilitate percolating of liquid therethrough and forming of a filter cake thereon;
(c) introducing raw wastewater to the coagulation-filtration assembly;
(d) mixing the raw wastewater with a coagulating agent in the coagulation-flocculation assembly so as to achieve coagulated wastewater;
(e) flocculating the coagulated wastewater in the coagulation-flocculation assembly, so as to achieve coagulated-flocculated wastewater slurry;
(f) applying the coagulated-flocculated wastewater slurry onto the filter cake at the filtration module so as to separate the coagulated-flocculated wastewater slurry to liquid and sludge;
(g) removing sludge from the filtration module;
(h) sensing a level parameter indicative of a level of the filter cake;
(i) responsive to the level parameter, generating a rate control signal configured to alter at least one of a rate of application of coagulated-flocculated wastewater slurry onto the filter cake, and a rate of removal of sludge from the filtration module.

According to an example, where the flocculation of the coagulated wastewater includes mixing of the coagulated wastewater with the flocculating agent, the method can further comprises the steps of:

(a) sensing a turbidity parameter indicative of turbidity of the liquid; and
(b) determining the amount of at least one of coagulating agent and flocculating agent being mixed, according to the value of the turbidity parameter so as to maintain at least a maximal level of turbidity of liquid.

According to Yet Another Example, the Method can Further Comprise the Steps of:

(a) sensing a size parameter indicative of size of flocs in the slurry at an area of the coagulated-flocculated wastewater outlet; and
(b) determining the amount of at least one of coagulating agent and flocculating agent being mixed, according to the value of the size parameter so as to maintain the size of the flocs in the slurry at the area of coagulated-flocculated wastewater outlet within a predetermined range.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
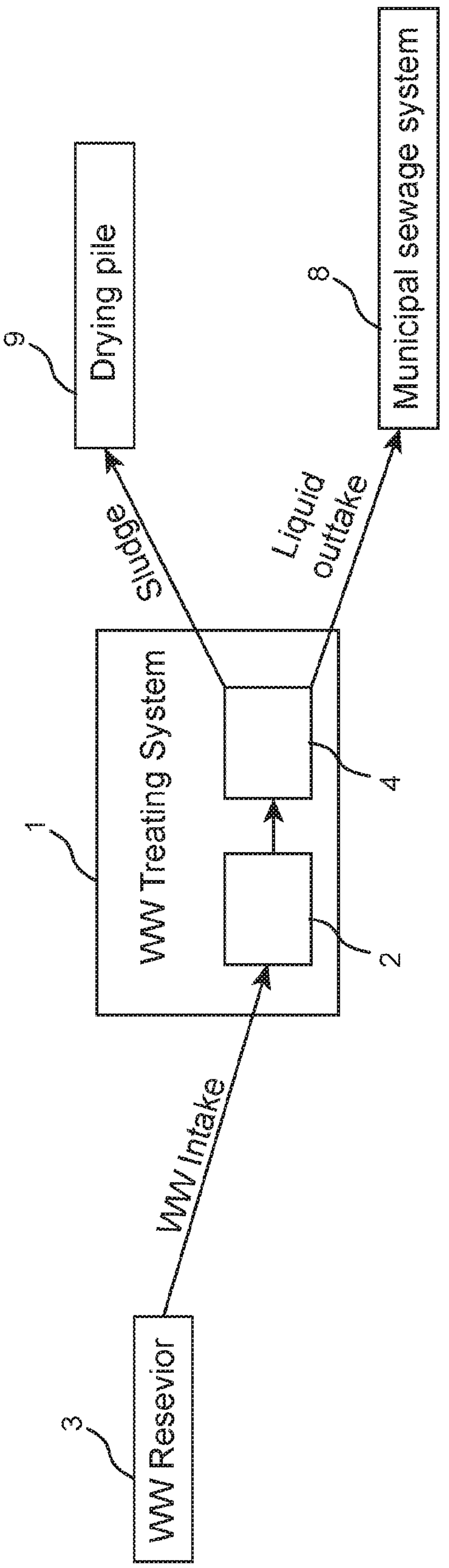
FIG. 1 illustrates a block diagram of a wastewater system according to an example of the presently disclosed subject matter, in use in a dairy farm facility.

Attention is first directed to FIG. 1 of the annexed drawings, illustrating a block diagram of a wastewater treatment system 1, according to an example of the presently disclosed subject matter, used for example in a dairy farm facility [not illustrated]. The system 1 is configured to receive wastewater intake, rich with suspended solids, from a wastewater reservoir 3, e.g., of the dairy farm, remove suspended solids therefrom, and produce a clearer liquid outtake, containing less suspended solids than the wastewater intake.

The system 1 comprises a coagulation-flocculation assembly 2 and a slurry separator 4.

The coagulation-flocculation assembly 2 is configured to receive the raw wastewater, facilitate coagulation and flocculation processes thereto so as to flock the suspended solids in the raw wastewater, and thereby turn the raw wastewater into a coagulated-flocculated wastewater slurry. The coagulation-flocculation assembly 2 is further configured to dispense the coagulated-flocculated wastewater slurry to the slurry separator 4 for separation thereof to liquid and sludge. The slurry separator 4 is configured to separate the wastewater slurry to liquid and sludge, dispense the liquid, optionally, to an effluent discharge, optionally directed to a municipal sewage system 8, and dispense the sludge, optionally, to a drying pile 9, where it can dry up and turn into manure, which can be later used for example for fertilizing fields.

Figure 2A:
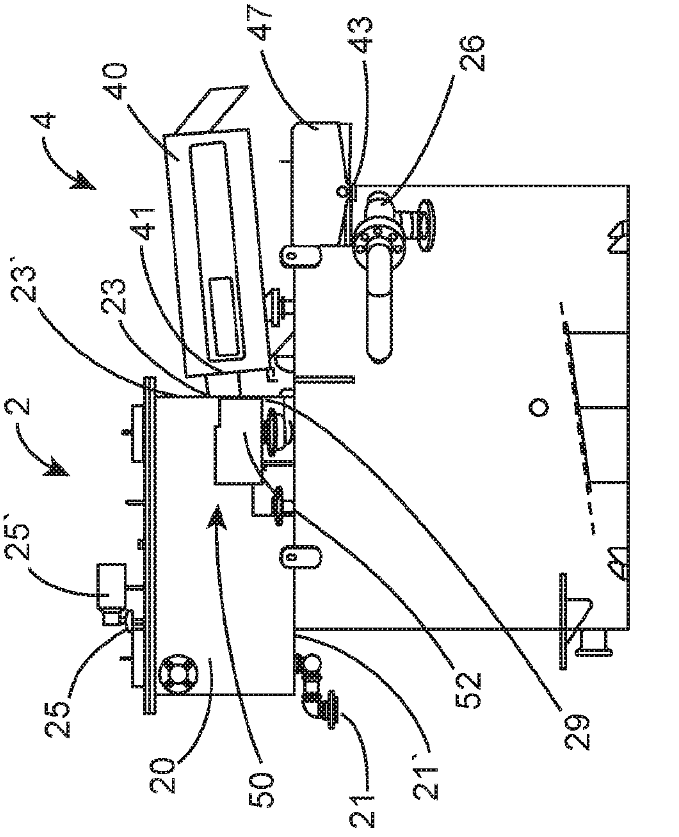
FIG. 2A illustrates a side view of an example of the system of FIG. 1, where some walls have been removed to reveal objects behind them.
Figure 2B:
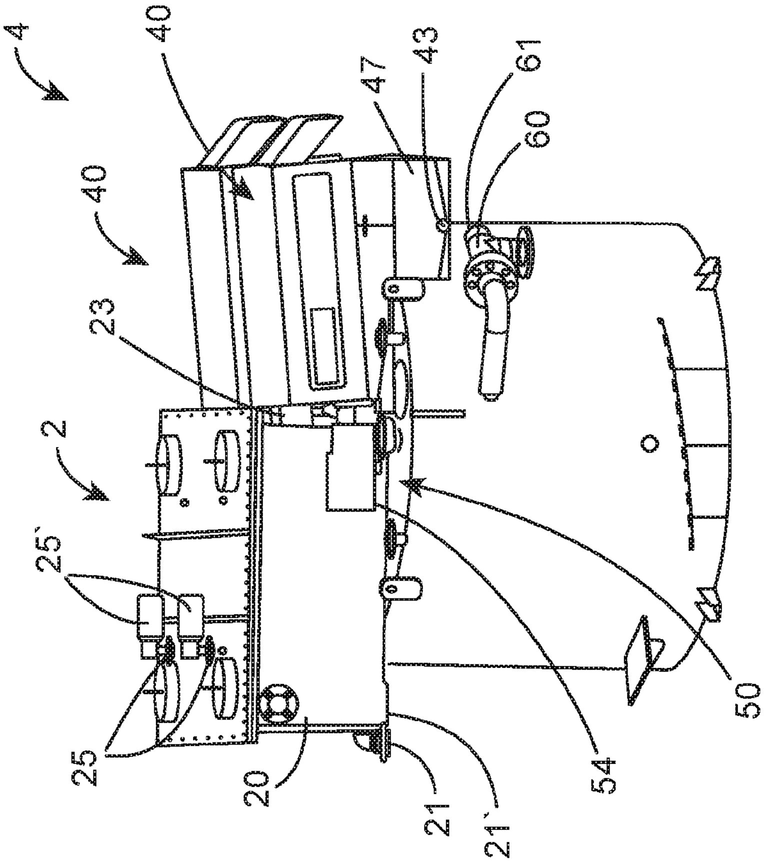
FIG. 2B illustrates a side perspective view of the system of FIG. 1.

With further reference being made also to FIGS. 2A and 2B, the coagulation-flocculation assembly 2 comprises a main tank 20 having a raw wastewater inlet 21 configured to receive raw wastewater from the wastewater reservoir 3 of the cowshed, through a supply line [not illustrated] coupled thereto. The raw wastewater inlet 21 is positioned in a bottom wall 21' of the main tank, thereby inducing flow of the raw wastewater entering the main tank 20. The main tank 20 further comprises two coagulated-flocculated wastewater outlets 23, each of which wider than the raw wastewater inlet, thus, it should be appreciated that the flow of coagulated-flocculated wastewater slurry out of the main tank 20 through the coagulated-flocculated wastewater outlet 23 is slower than the flow of raw wastewater into the main tank 20 through the raw wastewater inlet 21. The coagulated-flocculated wastewater outlets 23 are positioned in mid-height of a vertical exit wall 23' of the main tank, thereby constituting an overflow arrangement configured to facilitate passage therethrough for an upper portion of a given volume of wastewater. This upper portion is normally more sludgy and foamy than a respective lower portion of the same volume of wastewater, and is thus more suitable for separation thereof at the slurry separator 4.

The slurry separator 4 comprises two filtration modules 40, each having a coagulated-flocculated wastewater inlet 41 in flow communication with a respective coagulated-flocculated wastewater outlet 23 of the main tank 20, and is configured to receive coagulated-flocculated wastewater slurry therefrom. The flow communication herein is established via an auxiliary duct 44, configured to prevent splashes of coagulated-flocculated wastewater slurry when the latter passes from the outlet 23 to the inlet 41. In other embodiments of the presently disclosed subject matter, the outlet 23 and the inlet 41 can both be constituted by a single aperture.

On top of the main tank 20 there are two coagulating agent inlets 25, each of which is connected to a dispenser 25', configured to dispense coagulating agent therethrough to the main tank 20. According to an example of the present disclosure, the dispenser 25' is configured to release predetermined doses of coagulating agent to the main tank 20 at predetermined time lapses, optimized by an installer of the system 1 according to needs of a user of the system 1. The time lapses, as well as the size of the doses, can be pre-programmed to the dispenser 25' to determine a dosing rate of the flocculating agent, or be adjusted in real time by an actuator thereof [not illustrated], optionally coupled to a control system. The coagulating agent can be in the form of a solution, particulate material, or any other form which allow it to be mixed with the raw wastewater, and comprise for example salts of aluminum, iron, titanium, zirconium, or any other material being effective as a coagulating agent.

In operation, raw wastewater, rich with suspended solids, enter the main tank 20 through the raw wastewater inlet 21, where they are being mixed with coagulating agent being dispensed to the main tank 20 through the coagulating agent inlets 25 by the respective dispensers 25', causing the raw wastewater to go through a coagulation process and become coagulated wastewater.

The coagulated wastewater continues to mix by inertia inside the main tank 20, and thereby inducing a flocculation process thereto where the suspended solids come out of suspension and flock to turn the coagulated wastewater into a coagulated-flocculated wastewater slurry. The coagulated flocculated wastewater slurry exits the main tank 20 through the coagulated-flocculated wastewater outlets 23, and is being received at the coagulated-flocculated wastewater inlets 41 of the filtration modules 40, to be separated thereat into liquid and sludge, as will be explained hereinafter. According to an example of the presently disclosed subject matter, the main tank 20 further includes a mixing arrangement configured to boost the mixing to the raw wastewater with the coagulating agent. The description hereinabove refers to a journey of a given volume of raw wastewater. It should be appreciated that this coagulation-flocculation process is continuous, i.e. raw wastewater continuously enter the main tank 20 through the raw wastewater inlet 21, and go through coagulation-flocculation, while coagulated-flocculated wastewater slurry continuously exits the main tank 20 through the coagulated-flocculated wastewater outlet 23.

The raw wastewater inlet 21 and the coagulated-flocculated wastewater outlets 23 are arranged on the main tank 20 such that a flow regime within the main tank 20 is created, which causes a given volume of raw wastewater entering through the raw wastewater inlet 21 to spend sufficient mixing time in the main tank 20 to allow sufficient coagulation and sufficient flocculation to occur. In other embodiments of the presently disclosed subject matter, the system 1 can further include a valve arrangement configured to open and close at least the coagulated-flocculated wastewater outlets, to facilitate sufficient mixing time.

Figure 3A:
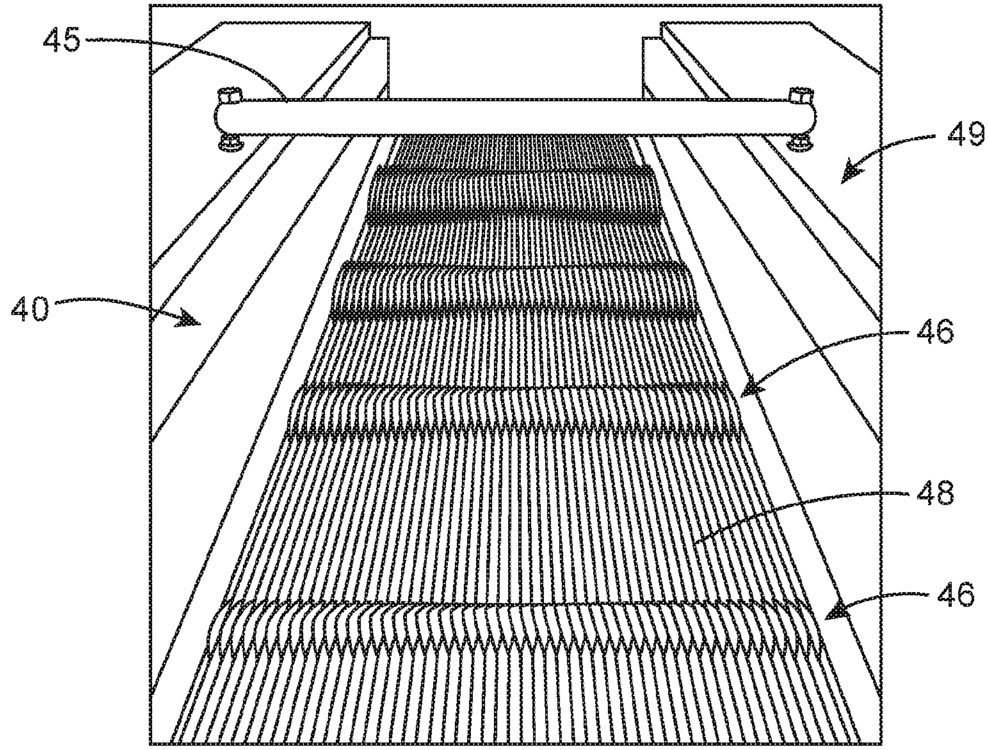
FIG. 3A illustrates a front perspective view of a conveyor of the system.
Figure 3B:
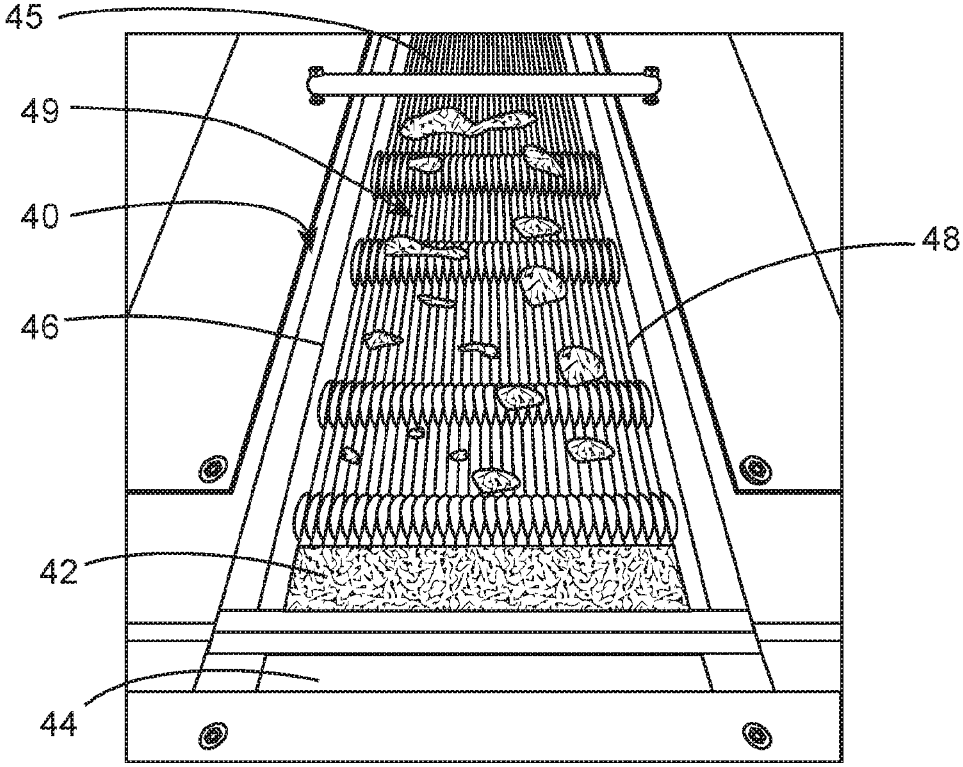
FIG. 3B illustrates a top perspective view of a conveyor of the system.

The two filtration modules 40, each comprising a conveyor 49, seen in FIGS. 3A and 3B, configured to facilitate percolating of liquid therethrough and forming of a filter cake 80 thereon, and thereby separating the coagulated-flocculated wastewater slurry to sludge and liquid. Each conveyor 49 comprises an intake area 42 and a sludge outlet 45 disposed distal from the intake area, and is configured to receive coagulated-flocculated wastewater slurry at the intake area 42, and convey the slurry from the intake area 42 to the sludge outlet 45, while allowing liquid to percolate therethrough during the conveyance, so that by the time the slurry reaches the sludge outlet 45, it is in the form of sludge.

According to other embodiments of the presently disclosed subject matter, the slurry separator can be a multi-stage slurry separator with two or more conveyors arranged sequentially one after the other, such that the sludge dispensed through the sludge outlet of the first conveyor, lands in the intake area of the sequential conveyor instead of the drying pile. Such arrangement can facilitate dryer sludge dispensed to the drying pile.

According to an example of the presently disclosed subject matter the conveyor 49 comprises rows 46 of rotating blades 48, arranged parallel to one another from the intake area 41 to the sludge outlet, configured for pushing the slurry/sludge towards the sludge outlet 45 with every rotation thereof, while allowing liquid to percolate therebetween.

The liquid percolating through the conveyor 49 drops onto a gutter-like element 47 in the form of a slide configured to funnel the liquid to the liquid outlet 43, from where it can be directed to the municipal sewer, optionally, by means of gravity. The sludge outlet 45 can be disposed above a designated piling area 81 of sludge, and can be configured to drop sludge onto the piling area 81, where it can dry up and turn into manure which can be later used for example for fertilizing fields.

The conveyor 49 can be a self-cleaning conveyor configured to prevent clogging thereof. According to an example of the presently disclosed subject matter, the rows 46 of rotating blades 48 are arranged such that each row 46 is aligned with its adjacent other to cause each blade 48 in the row to slide over a mating blade 48 in the adjacent row with every rotation, and thereby clean it.

Figure 3C:
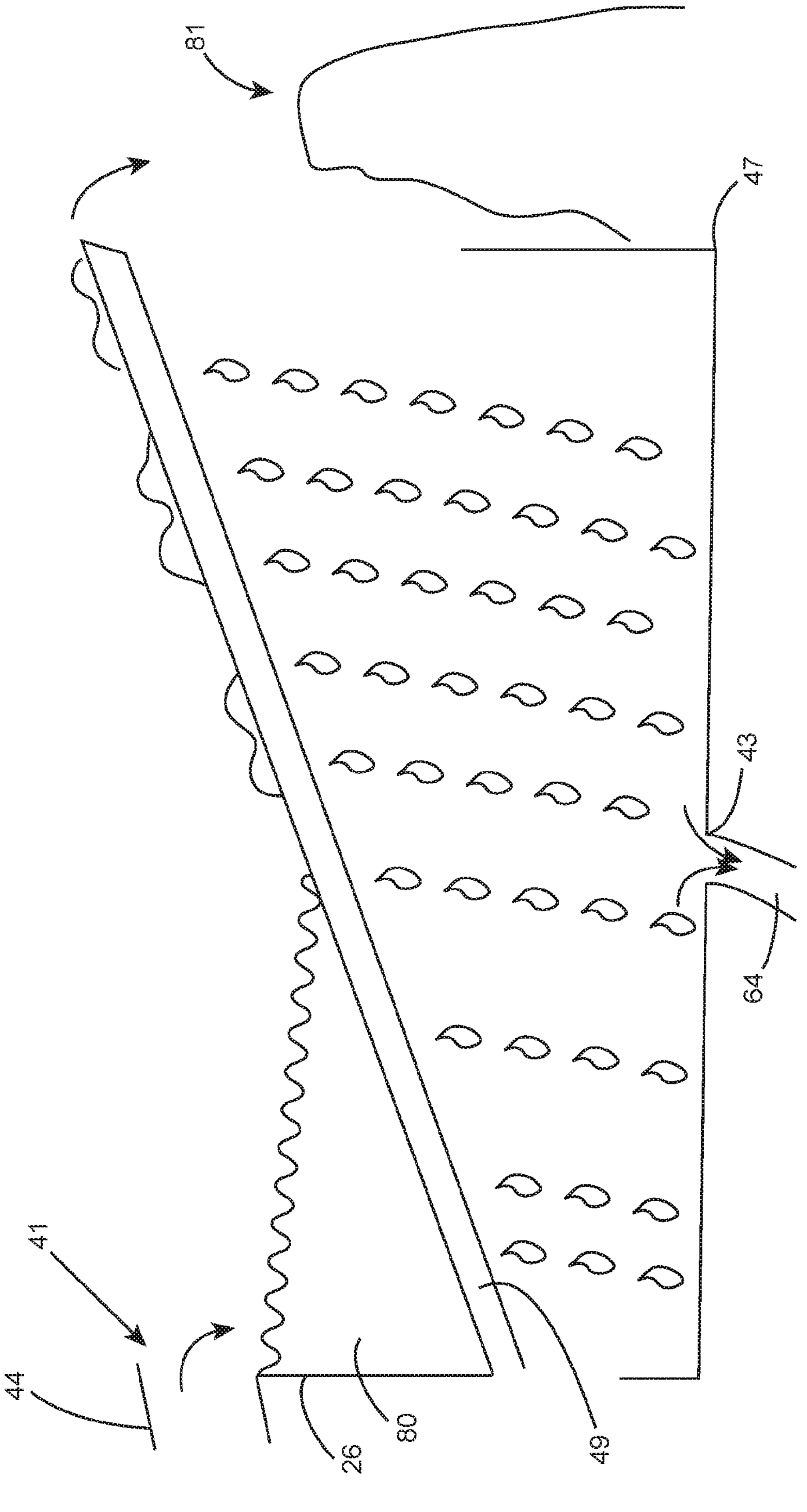
FIG. 3C illustrates a schematic cross section of the conveyor of FIGS. 3A and 3B.

An example of such conveyor is a wave separator/multi-disc roller separator by: Kendensha/Trident/Benenv et cetera As seen in FIG. 3C, the conveyor 49 is sloped upwards towards the sludge outlet 45, such that the intake area 42 is disposed at a lowermost portion thereof. Further, the coagulated-flocculated wastewater inlet 41 of each filtration module 40 is disposed above that intake area 42, creating appropriate conditions for forming of the filter cake 80 thereat. The filter cake 80 can lean on a wall 26 containing the coagulated-flocculated wastewater outlet 41, disposed oppositely to the sloped conveyor 49, and thereby enhance its stability. In other embodiments of the presently disclosed subject matter [not shown], instead or in addition to the sloped conveyor 49, the filtration module can further include a barrier at the intake area 42, configured to partially block the passage of wastewater slurry/sludge on the conveyor, so as to maintain a minimal level of slurry/sludge, i.e., filter cake 80 at the intake area 42.

Since the wastewater slurry is initially received at the intake area 42 of the conveyor 49, most of the separation between sludge and liquid occurs thereat and is being facilitated by the filter cake 80. For that reason, the level of the filter cake 80 at the intake area 42 is important for determining the quality of liquid at the liquid outlet 43.

It should be appreciated that the conveyor 49 is configured such that the rate of conveyance of slurry/sludge from the intake area 42 to the sludge outlet 43, i.e. the rate of rotation of the rotating blades 48 is adjustable, e.g. by an actuator [not illustrated] of the conveyor 49. This adjustable rate affect the rate of removal of slurry/sludge from the intake area where the filter cake 80 is positioned, and thus affect the level of the filter cake 80. The higher the rate of rotation/conveyance is, the less slurry/sludge is accumulated at the intake area 42, thus the lower the filter cake 80 is. An effective level of the filter cake 80 should facilitate liquid outtake in a quality which meets the standards of local environmental regulations for disposal thereof through the effluent discharge, optionally to the municipal sewage system, as well as rapid conveyance of sludge to the sludge outlet.

To maintain this effective level of the filter cake 80, the wastewater treatment system 1 further comprises a level maintaining arrangement. The level maintaining arrangement comprises a sensor configured to sense a level parameter indicative of the level of the filter cake 80 at the intake area 41, and a controller 54 configured to adjust the level of the filter cake 80 responsive to the readings of the sensor, by controlling the actuator of the conveyor 49.

According to an example of the presently disclosed subject matter, the sensor herein is a level sensor 52, in other embodiments of the presently disclosed subject matter, the sensor can be an optic sensor or any other sensor configured to sense the level of the filter cake 80. The level sensor 52 is positioned within the main tank 20, so as to sense the level of wastewater within the main tank 20. Since there is free flow from the coagulated-flocculated wastewater outlet 23 to the intake area 42, i.e. onto the filter cake 80, through the coagulated-flocculated wastewater inlet 41, it can be appreciated that the level of wastewater within the main tank 20 is indicative of the level of the filter cake 80 at the intake area 42.

The sensor 52 is configured to produce a level signal to the controller 54, indicative of a current level of wastewater within the main tank 20. i.e. indicative of the level of the filter cake 80. The controller 54 is configured to continuously receive the level signal from the sensor 52, and produce corresponding conveyance rate signals to the actuator [not illustrated] of the conveyor 49, so as to adjust the conveyance/blade rotation rate of the conveyor 49, and thereby adjust the level of the filter cake 80. Specifically, the controller 54 is configured to increase the conveyance/blade rotation rate when the level of wastewater within the main tank 20 rises, and decrease the conveyance rate of sludge when the level of wastewater within the main tank 20 lowers, and thereby maintain a predetermined level of filter cake 80 at the intake area 41.

The level sensor 52 can be analog or digital, it can have a continuous scale sensitive to a plurality of different levels of wastewater, or a binary scale sensitive to one or two threshold values of the level parameter. In the latter case, the sensor 52 can be configured to produce a level signal only when the level parameter rises above/goes below that threshold value.

Figure 4A:
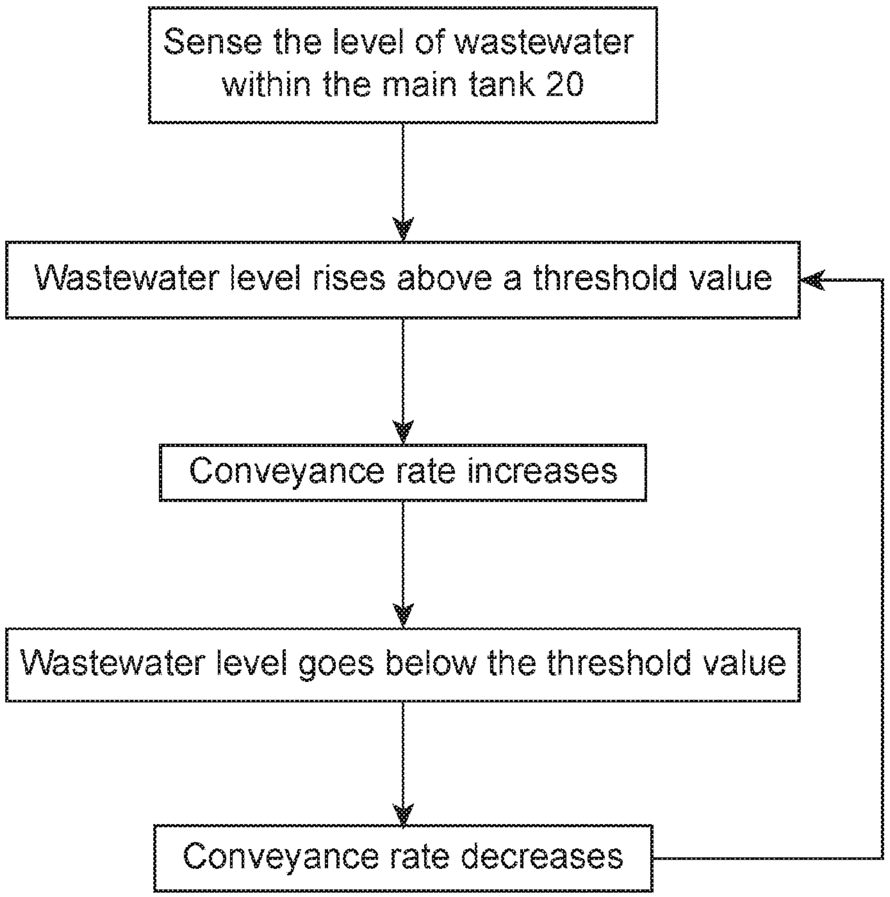
FIG. 4A illustrates a block diagram of a feedback process between a sensor and a controller according to an example of the presently disclosed subject matter.

The sensor can be positioned on an inner face of a mounting wall 29 of the main tank 20, containing the coagulated-flocculated wastewater outlet 23, so as to sense the level of wastewater in the main tank most proximal to the coagulated-flocculated wastewater outlet 23. The controller can be positioned anywhere in the system 1 from which it can receive the level signals from the sensor 52 and produce control signals to the actuator of the conveyor 49. An example of a feedback process between the sensor 52 and the controller 54 is illustrated in FIG. 4A, where the conveyance rate of sludge/slurry on the conveyor 49 is determined according to readings of the level sensor 52 disposed within the main tank 20, by the controller 54.

According to an example of the presently disclosed subject matter, the dosing of coagulating agent to the main tank 20 is also performed at an adjustable dosing rate, controlled by an actuator [not illustrated] of the dispenser 25', being also controlled by the controller 54. In this example, this adjustable dosing rate determines the extent of flocculation of the coagulated-flocculated wastewater, i.e. the amount of sludge which can be separated from a volume of coagulated-flocculated wastewater slurry. The higher the dosing rate of coagulating agent to the main tank 20 is, the more sludge can be separated from a given volume of coagulated-flocculated wastewater slurry, and the clearer the liquid is at the liquid outlet. The amount of sludge in a given volume of wastewater slurry should facilitate liquid outtake in a quality which meets the standards of local environmental regulations for disposal thereof through the effluent discharge, optionally to the municipal sewage system. On the other hand, it is a purpose to avoid clogging of any component of the system 1, which can be caused due to creating to much sludge in a given volume of wastewater slurry, i.e. due to excessive dosing of coagulating agent.

The system 1 can further include a turbidity sensor 60 configured to sense a turbidity parameter indicative of the turbidity of liquid at the liquid outlet 43. The sensor 60 can be positioned at an outlet pipe 61 of the system funneling the liquid to the effluent discharge and can be configured to work in conjunction with the controller 54 to prevent turbidity to exceed a pre-determined level.

The turbidity sensor 60 can be optic, configured to illuminate the liquid passing in the outlet pipe 61, and measure the incident light scattered therefrom, optionally by a photodiode, which can produce corresponding turbidity signals to the controller 54 indicative of the concentration of suspended solids in the liquid, i.e. turbidity of the liquid.

The turbidity sensor 60 can be analog or digital, it can have a continuous scale sensitive to a plurality of different turbidity levels, or a binary scale sensitive to one or two threshold values of the turbidity parameter. In the latter case, the turbidity sensor 60 can be configured to produce a turbidity signal only when the turbidity parameter rises above/goes below that threshold value.

The controller 54 can be configured to receive these turbidity signals from the turbidity sensor 60, and produce corresponding dosing rate signals to the actuator [not illustrated] of the dispenser 25' so as to adjust the dosing rate of coagulating agent to the main tank 20.

Specifically, the controller 54 can be configured to increase the dosing rate of coagulating agent to the main tank 20 when the level of turbidity of liquid at the liquid outlet 43 rises, and decrease the dosing rate when the level of turbidity of liquid at the liquid outlet 43 lowers, so as to maintain a predetermined level of turbidity of liquid at the liquid outlet 43.

Figure 4B:
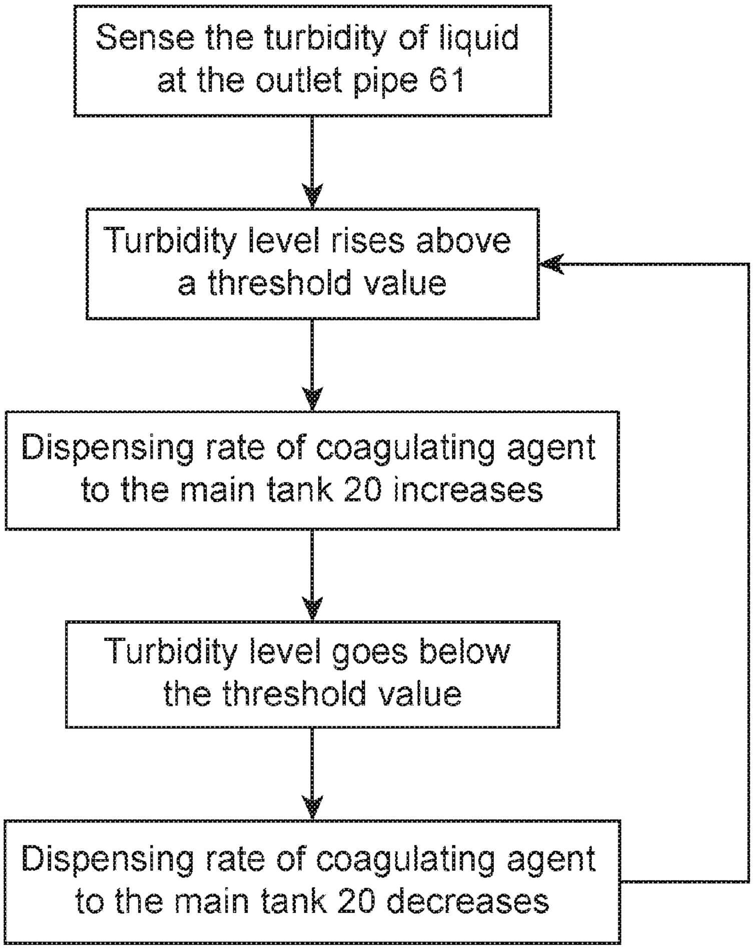
FIG. 4B illustrates a block diagram of a feedback process between another sensor and the controller according to an example of the presently disclosed subject matter.

An example of a feedback process between the sensor 60 and the controller 54 is illustrated in FIG. 4B, where the dosing rate of coagulating agent to the main tank 20 is determined according to readings of turbidity sensor 60 disposed on the outlet pipe 61, by the controller 54.

Figure 5A:
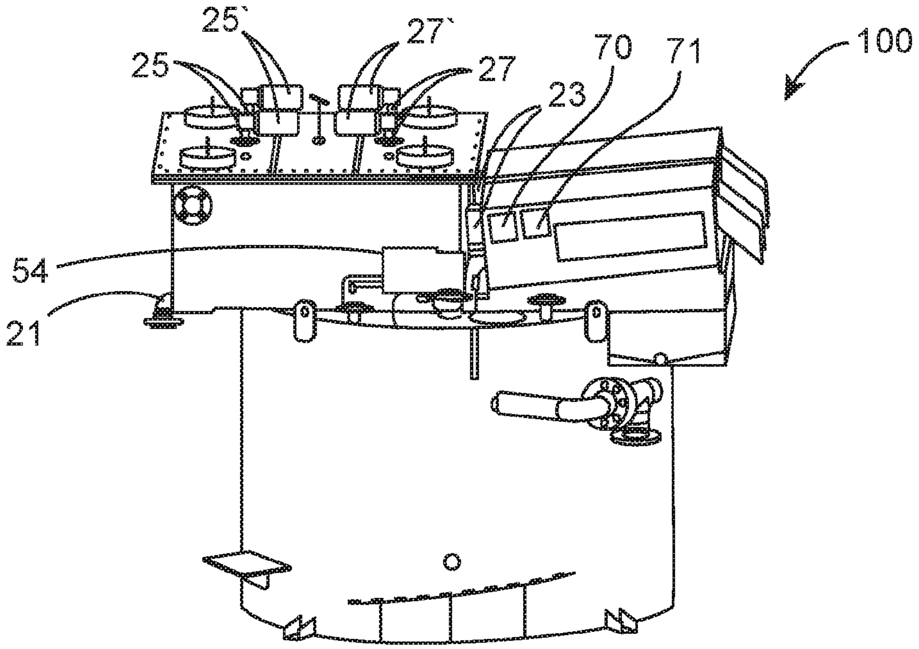
FIG. 5A illustrates a side perspective view of a system according to another example of the presently disclosed subject matter.
Figure 5B:
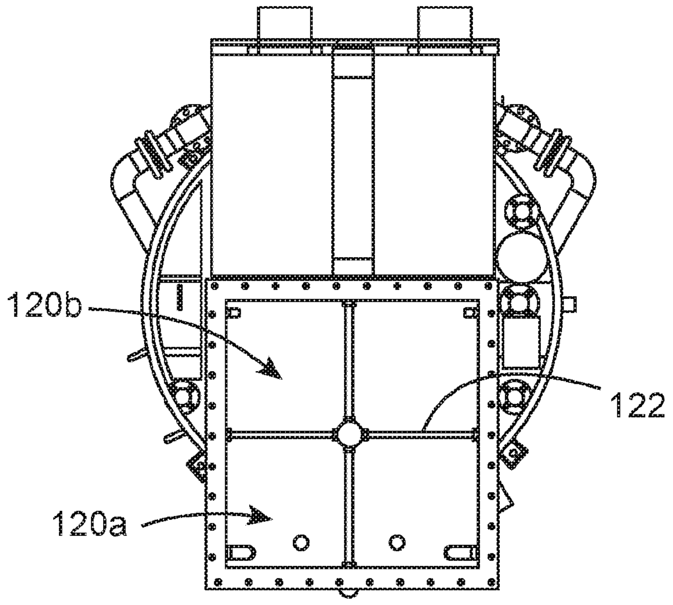
FIG. 5B illustrates a top view of the system of FIG. 5A, where an upper wall of a coagulation-flocculation tank thereof has been removed.

FIGS. 5A and 5B illustrate another example of a wastewater treatment system 100 in which the main tank is divided to a coagulation tank 120*a* configured to facilitate coagulation of raw wastewater therein to achieve coagulated wastewater, and a flocculation tank 120*b* configured to facilitate flocculation of the coagulated wastewater therein to achieve coagulated-flocculated wastewater slurry.

The coagulation tank 120*a* comprises the raw wastewater inlet 21, whilst the flocculation tank 120*b* comprises the coagulated-flocculated wastewater outlets 23. The two tanks are disposed adjacent to each other such that they have a common wall 122 between them, with an aperture [not seen] allowing free flow therebetween, and thereby constituting an outlet of the coagulation tank 120*a* as well as an inlet of the flocculation tank 120*b*.

In this example, the two coagulation agent inlets 25 are disposed on top of the coagulation tank 120*a* and are configured to facilitate the dosing of coagulating agent to the coagulation tank 120*a*.

In operation, raw wastewater, rich with suspended solids, enter the main tank 20 through the raw wastewater inlet 21, where they are being mixed with coagulating agent being dispensed to the main tank 20 through the coagulating agent inlets 25 by the respective dispensers 25', causing the raw wastewater to go through a coagulation process and become coagulated wastewater.

The system 1 further comprises two flocculation agent inlets 27 disposed on top of the flocculation tank 120*b*, each of which being connected to a dispenser 27, configured to dispense flocculating agent therethrough to the flocculation tank 120*b*.

According to an example of the present disclosure, the dispenser 27 is configured to release predetermined doses of flocculating agent to the flocculation tank 120*b* at predetermined time lapses, optimized by an installer of the system 1 according to needs of a user of the system 1. The time lapses, as well as the size of the doses can be pre-programmed to the dispenser 25', or be adjusted in real time by an actuator thereof [not illustrated], optionally coupled to a control system, to determine a dosing rate of the coagulating agent. The flocculating agent can be in the form of a solution, particulate material, or any other form which allow it to be mixed with the coagulated wastewater, and comprise for example salts of aluminum, iron, calcium, magnesium, or any other material being effective as a flocculating agent.

In operation, raw wastewater, rich with suspended solids, enter through the raw wastewater inlet 21 into the coagulation tank 120*a*, and continue from there to the flocculation tank 120*b* through the aperture in the wall 122. Simultaneously, coagulating agent and flocculating agent are dispensed to the coagulation tank 120*a* and the flocculation tank 120*b* respectively, through their respective inlets 25,27 by their respective dispensers 25',27', at a predetermined rate. The raw wastewater are mixed by inertia within the coagulation tank 120*a* together with the coagulation agent and turn into coagulated wastewater, which exits the coagulation tank 120*a* through the aperture in the wall 122 to reach the flocculation tank 120*b* and mix thereat, also by inertia with the flocculation agent. The raw wastewater inlet 21 and the aperture in the wall 122 are arranged such that a flow regime within the coagulation tank 120*a* is created, which causes the raw wastewater entering through the raw wastewater inlet 21 to spend enough time mixing in the coagulation tank 120*a* to allow sufficient coagulation to occur, before exiting the coagulation tank 120*a* through the aperture in the wall 122 as coagulated wastewater.

The coagulated wastewater enter the flocculation tank 120*b* through the aperture in the wall 122, and mix there by inertia with the flocculation agent, before exiting the flocculation tank 120*b* through the coagulated-flocculated wastewater outlet 23 as coagulated-flocculated wastewater slurry.

It should be appreciated that the aperture in the wall 122 and the coagulated-flocculated wastewater outlet 23 are arranged on the flocculation tank such that a flow regime within the flocculation tank 120*b* is created, which causes the coagulated wastewater entering through the aperture to spend enough time mixing in the flocculation tank 120*b* to allow sufficient flocculation to occur, before exiting the flocculation tank 120*b* as coagulated-flocculated wastewater.

As a whole, in the coagulation-flocculation process as described, raw wastewater enters through the raw wastewater inlet 21, and turns into coagulated-flocculated wastewater slurry exiting through the raw wastewater outlet 23.

According to an example of the presently disclosed subject matter, the dosing of flocculating agent to the flocculation tank **120*b* is also performed at an adjustable dosing rate, controlled by an actuator [not illustrated] of the dispenser 27, being also controlled by the controller 54. In this example, this adjustable dosing rate determines the extent of aggregation of solids in the coagulated-flocculated wastewater slurry, i.e. the amount of flocks of solids, which either precipitate to the bottom or float to the surface of the liquid, in a given volume of coagulated-flocculated wastewater slurry. The higher the dosing rate of flocculating agent to the flocculation tank 120*b* is, the more flocks of formerly suspended solids will be present in a given volume of coagulated-flocculated wastewater slurry. The amount of flocked solids in a given volume of wastewater slurry should facilitate liquid effluent in a quality which complies with limits of local environmental regulations. On the other hand, it is a purpose to avoid having small flocks, since these flocks can percolate together with the liquid through the filtration module 40**.

The system 1 can further include a floc-size sensor configured to sense parameter indicative of the common size of flocs in the coagulated-flocculated wastewater slurry at an area of the coagulated-flocculated wastewater outlet. The floc-size sensor can be positioned in the auxiliary duct 44 funneling the coagulated-flocculated wastewater slurry from the outlet 23 of the flocculation tank **120*b* to the inlet 41** of the filtration module.

According to an example of the presently disclosed subject matter, the floc-size sensor is in the form of a camera 70 configured to monitor the slurry passing in the duct 44. The camera 70 can be configured to work in conjunction a processor 71 equipped with an image processing module, configured to process images from the camera 70 to evaluate the common size of flocs in the slurry. The camera 70 together with the processor 71 can be configured to work in conjunction with the controller 54, to form a floc-size maintaining arrangement, configured to maintain the floc-size in the slurry at an area of the duct. i.e. at an area of the coagulated-flocculated wastewater outlet 23, within a predetermined range.

The processor 71 can have a continuous scale sensitive to a plurality of different floc-sizes, or a binary scale sensitive to two threshold values of floc-size. In the latter case, the processor 71 can be configured to produce a size signal when the common size of flocks rises above and goes below each of the two threshold values.

The controller 54 can be configured to receive these size signals from the processor 71, and produce corresponding dosing rate signals to the actuator [not illustrated] of the dispenser 27' so as to adjust the dosing rate of flocculating agent to the flocculating tank **120*b***.

Specifically, the controller 54 can be configured to increase the dosing rate of flocculating agent to the flocculation tank **120*b* when the floc size in the slurry at the duct 44 rises above a first threshold, and decrease that dosing rate when the floc size in the slurry at the duct 44 goes below a second threshold, lower than the first, so as to maintain the floc-size in the slurry at the duct 44** within the predetermined range.

Figure 6:
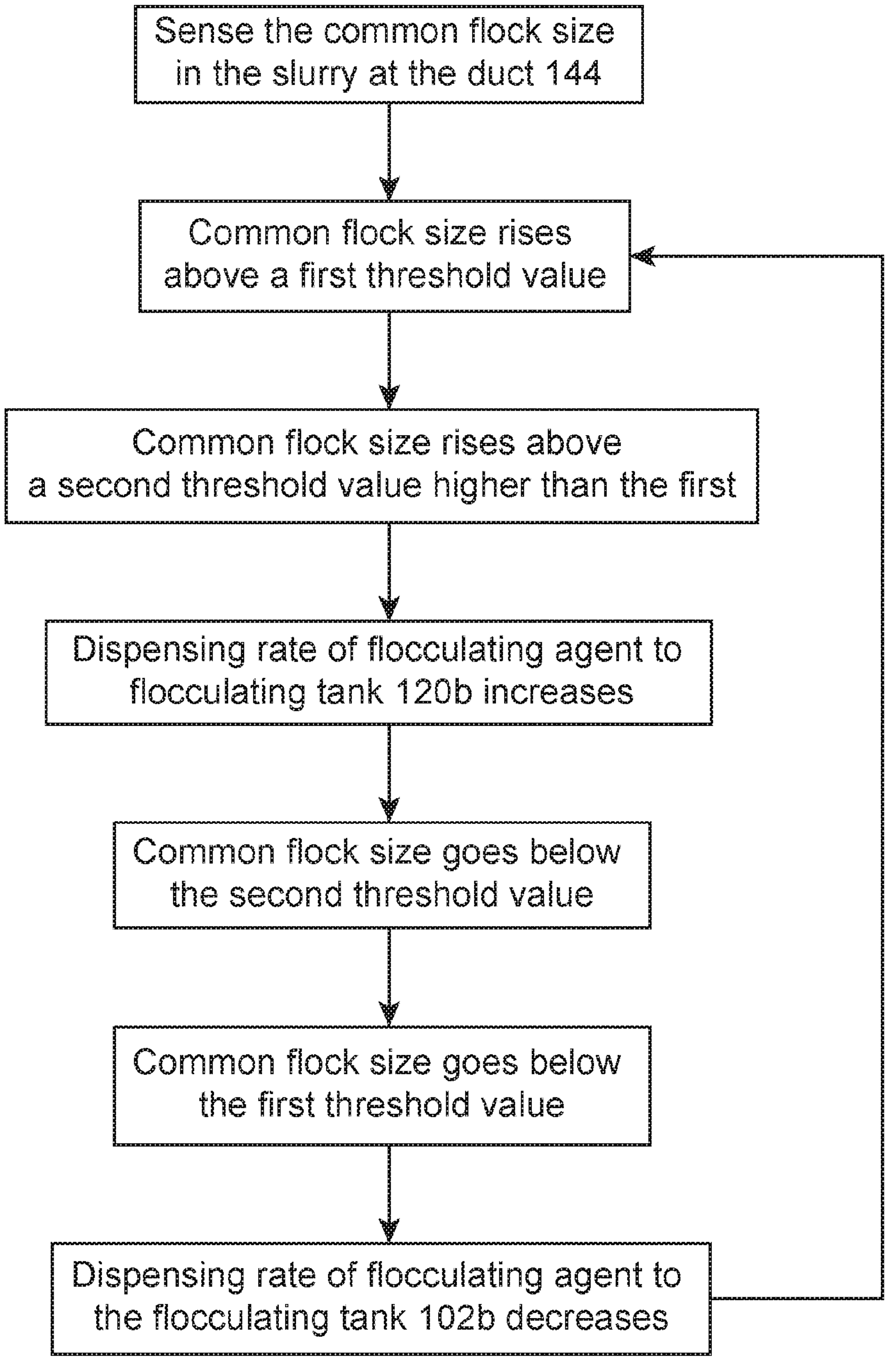
FIG. 6 illustrates a block diagram of a feedback process between a processor and the controller according to an example of the presently disclosed subject matter.

An example of a feedback process between the processor 71 and the controller 54 is illustrated in FIG. 6, where the dosing rate of coagulating agent to the flocculation tank **120*b* is determined according to readings of the camera 70, by the controller 54**.

Overall, the process of receiving wastewater, rich with suspended solids, and performing coagulation-flocculation thereon to turn them into coagulated-flocculated wastewater slurry, and then performing separation of the slurry to liquid and sludge, as performed by the systems 1 and 100 includes:

(a) providing a coagulation-flocculation assembly e.g., the main tank 20, or the coagulation tank **120*a* together with the flocculation tank 120*b***;

(b) providing a filtration module, e.g., the filtration module 40, configured to facilitate percolating of liquid therethrough and forming of a filter cake thereon;

(c) introducing raw wastewater to the coagulation-filtration assembly, e.g. through the raw wastewater inlet 21;

(d) mixing the raw wastewater with a coagulating agent in the coagulation-flocculation assembly so as to achieve coagulated wastewater, (e) flocculating the coagulated wastewater in the coagulation-flocculation assembly, so as to achieve coagulated-flocculated wastewater slurry;

(f) applying the coagulated-flocculated wastewater slurry onto the filter cake at the filtration module so as to separate the coagulated-flocculated wastewater slurry to liquid and sludge;

(g) removing sludge from the filtration module, i.e. from the filter cake, at an adjustable rate;

(h) sensing a level parameter indicative of a level of the filter cake;

(i) responsive to the level parameter, generating a rate control signal configured to alter at least one of a rate of application of coagulated-flocculated wastewater slurry onto the filter cake, and a rate of removal of sludge from the filtration module.

According to an example, the flocculation of the coagulated wastewater includes mixing of the coagulated wastewater with the flocculating agent.

The Method can Further Comprises the Steps of:

(a) sensing a turbidity parameter indicative of turbidity of the liquid, e.g., at the liquid outlet 43, e.g. sensing the turbidity of liquid at the liquid outtake supply line by the turbidity sensor 60; and (b) determining the amount of at least one of coagulating agent and flocculating agent being mixed, according to the value of the turbidity parameter so as to maintain at least a maximal level of turbidity of liquid, e.g., at the liquid outlet 43, by the controller 54.

The Process can Further Comprise the Steps of:

(a) sensing a size parameter indicative of size of flocs in the slurry at an area of coagulated-flocculated wastewater outlet 23, i.e. monitoring the floc-size thereat by the camera 70 together with the processor 71.

(b) determining the amount of at least one of coagulating agent and flocculating agent being mixed, according to the value of the size parameter so as to maintain the size of the flocs in the slurry, e.g., at the area of the coagulated-flocculated wastewater outlet 23 within a predetermined range, e.g., by the controller 54.

It should be appreciated that although the raw wastewater intake to the coagulation-flocculation assembly 2 originates in the wastewater reservoir of the dairy farm, according to some embodiments of the present disclosure, these raw wastewater has gone through preliminary mixing in a mixing tank 9 after being pumped from the reservoir and before entering the coagulation-flocculation assembly 2.

The invention claimed is:

1. A system for treating wastewater, comprising:

a coagulation-flocculation assembly comprising at least one tank having a raw wastewater inlet, a coagulated-flocculated wastewater outlet, a coagulating agent inlet configured to facilitate introduction of coagulating agent to the coagulation-flocculation assembly, said coagulation-flocculation assembly being configured to receive raw wastewater through said raw wastewater inlet, facilitate mixing of the raw wastewater with the coagulating agent therein so as to form coagulated wastewater, facilitate flocculation of the coagulated wastewater so as to form coagulated-flocculated wastewater slurry, and dispense the coagulated-flocculated wastewater slurry through said coagulated-flocculated wastewater outlet; and a slurry separator comprising an intake area configured for receiving the coagulated-flocculated wastewater slurry from said coagulated-flocculated wastewater outlet, a liquid outlet, a sludge outlet, and a filtration module configured to facilitate percolating of liquid therethrough and forming of a filter cake thereon; said slurry separator being configured to receive slurry at said intake area, separate said slurry to liquid and sludge by said filtration module, remove said liquid via said liquid outlet, and convey said sludge from the intake area to said sludge outlet;

wherein said filtration module is a conveyer configured to convey sludge from said intake area to said sludge outlet, while facilitating percolating of liquid therethrough, wherein the removal of the sludge through the sludge outlet is performed at an adjustable rate, controlled by a respective actuator thereof, and wherein the system further comprises a level maintaining arrangement configured to maintain at least a minimal level of the filter cake, comprising:

a sensor configured to sense a level parameter indicative of the height of the filter cake on the filtration module, and produce a corresponding level signal indicative of the value of said level parameter; and a controller configured to receive said level signal and produce a corresponding rate signal configured to be received by the respective actuator so as to adjust the respective rate thereof, to maintain at least a minimal level of the filter cake on the filtration module, wherein the level parameter comprises a level of wastewater in the at least one tank, and wherein the level of the wastewater in the at least one tank is indicative of the level of the filter cake.

2. The system according to claim 1, wherein the actuator is configured to adjust a removal rate of the sludge through the sludge outlet.

3. The system for treating wastewater according to claim 1, wherein the at least one tank of said coagulation-flocculation assembly comprises:

a coagulation tank comprising said raw wastewater inlet, a coagulated wastewater outlet, and said coagulating agent inlet, said coagulation tank being configured to receive the raw wastewater through said raw wastewater inlet, facilitate mixing of the raw wastewater with the coagulating agent therein, and facilitate evacuating of the coagulated wastewater therefrom through said coagulated wastewater outlet; and a flocculation tank comprising a coagulated wastewater inlet being in flow communication with said coagulated wastewater outlet, and said coagulated-flocculated wastewater outlet; said flocculation tank being configured to receive the coagulated wastewater through said coagulated wastewater inlet, facilitate flocculation of the coagulated wastewater therein, and facilitate dispensing of said coagulated-flocculated wastewater therefrom through said coagulated-flocculated wastewater outlet.

4. The system according to claim 1, wherein the coagulation-flocculation assembly further comprises a flocculating agent inlet configured to facilitate introduction of flocculating agent to the coagulation-flocculation assembly.

5. The system according to claim 4, wherein said flocculation of the coagulated wastewater includes mixing of the coagulated wastewater with said flocculating agent.

6. The system for treating wastewater according to claim 1, wherein the system further comprises a turbidity sensor configured to sense a turbidity parameter indicative of a turbidity of said liquid.

7. The system according to claim 6, wherein the introduction of at least one of said flocculating agent and said coagulating agent is performed at an adjustable supply rate determined according to readings of said turbidity sensor so as to maintain at least a maximal level of turbidity of said liquid.

8. The system according to claim 1, further comprising a floc-size sensor configured to sense a size parameter indicative of size of flocs in said slurry at an area of said coagulated-flocculated wastewater outlet.

9. The system according to claim 8, wherein the introduction of at least one of said flocculating agent and said coagulating agent is performed at an adjustable supply rate determined according to readings of said floc-size sensor so as to maintain the size of the flocs in said slurry at an area of said coagulated-flocculated wastewater outlet within a predetermined range.

10. The system according to claim 1, wherein said conveyer is at least partially sloped upwards towards said sludge outlet so as to contribute to the forming of the filter cake.

11. The system according to claim 1, wherein the sensor comprises a level sensor operatively coupled to the at least one tank.

12. The system according to claim 1, wherein the at least one tank is separate from the slurry separator.

13. A method for treating wastewater by using the system for treating wastewater recited in claim 1, the method comprising:

(a) providing a coagulation-flocculation assembly comprising at least one tank;

(b) providing a filtration module configured to facilitate percolating of liquid therethrough and forming of a filter cake thereon, wherein said filtration module is a conveyer;

(c) introducing raw wastewater to the coagulation-flocculation assembly;

(d) mixing the raw wastewater with a coagulating agent in the coagulation-flocculation assembly so as to achieve coagulated wastewater;

(e) flocculating the coagulated wastewater in the coagulation-flocculation assembly, so as to achieve coagulated-flocculated wastewater slurry;

(f) applying the coagulated-flocculated wastewater slurry onto the filter cake at the filtration module so as to separate the coagulated-flocculated wastewater slurry to liquid and sludge;

(g) removing sludge from the filtration module; and (h) responsive to a level parameter indicative of the height of the filter cake, generating a rate control signal configured to alter a rate of removal of sludge from the filtration module via said conveyor, to maintain at least a minimal level of the filter cake on the filtration module, wherein the level parameter comprises a level of the wastewater in the at least one tank, and wherein the level of said wastewater in the at least one tank is indicative of the level of the filter cake.

14. The method according to claim 13, wherein the flocculation of the coagulated wastewater includes mixing of the coagulated wastewater with the flocculating agent, further comprises:

(a) sensing a turbidity parameter indicative of turbidity of the liquid; and (b) determining the amount of at least one of coagulating agent and flocculating agent being mixed, according to the value of the turbidity parameter so as to maintain at least a maximal level of turbidity of liquid.

15. The method according to claim 13, further comprising:

(a) sensing a size parameter indicative of size of flocs in slurry at an area of the coagulated-flocculated wastewater outlet; and (b) determining the amount of at least one of coagulating agent and flocculating agent being mixed, according to the value of the size parameter so as to maintain the size of the flocs in the slurry at the area of coagulated-flocculated wastewater outlet within a predetermined range.

* * * * *